United States Patent [19]

Henson

[11] Patent Number: 4,603,353
[45] Date of Patent: Jul. 29, 1986

[54] LUMINANCE PEAKING FILTER FOR USE IN DIGITAL VIDEO SIGNAL PROCESSING SYSTEMS

[75] Inventor: Michael A. Henson, Indianapolis, Ind.

[73] Assignee: RCA Corporation, Princeton, N.J.

[21] Appl. No.: 603,290

[22] Filed: Apr. 23, 1984

Related U.S. Application Data

[63] Continuation-in-part of Ser. No. 572,364, Jan. 19, 1984, abandoned.

[51] Int. Cl.⁴ .................... H04N 5/14; H04N 9/64
[52] U.S. Cl. .................... 358/166; 358/38; 358/39
[58] Field of Search ............ 358/160, 166, 37, 38, 358/39, 36

[56] References Cited

U.S. PATENT DOCUMENTS

| | | | |
|---|---|---|---|
| 2,263,376 | 11/1941 | Blumlein et al. | 178/44 |
| 3,984,631 | 10/1976 | Avicola | 178/7.3 R |
| 3,984,865 | 10/1976 | Avins | 358/36 |
| 4,041,531 | 8/1977 | Bingham | 358/37 |
| 4,074,308 | 2/1978 | Gibson | 358/38 |
| 4,437,124 | 3/1984 | Cochran | 358/166 |
| 4,538,178 | 8/1985 | Bolger | 358/166 |

*Primary Examiner*—Tommy P. Chin
*Attorney, Agent, or Firm*—Eugene M. Whitacre; Paul J. Rasmussen; Eric P. Herrmann

[57] ABSTRACT

A digital luminance processing circuit for peaking or depeaking high frequency luminance signal components includes the parallel combination of a low pass circuit and a bandpass circuit. The relative magnitude of the bandpass response is controlled by a linearly variable multiplier constructed with minimal hardware including four AND gates and three adders. The low pass and bandpass circuits share delay stages to further reduce hardware. The overall response of the processing circuit closely emulates the frequency response to processed luminance signal in current analog television receivers over the video signal frequency range.

24 Claims, 7 Drawing Figures

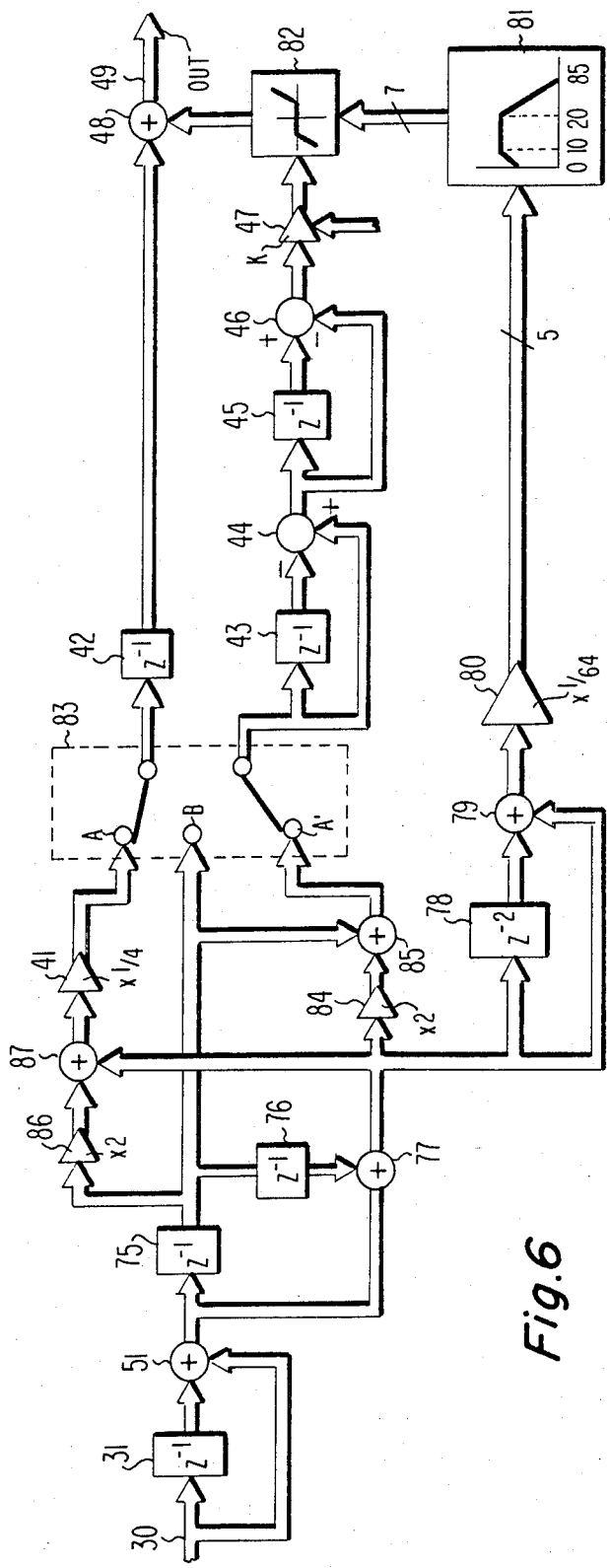
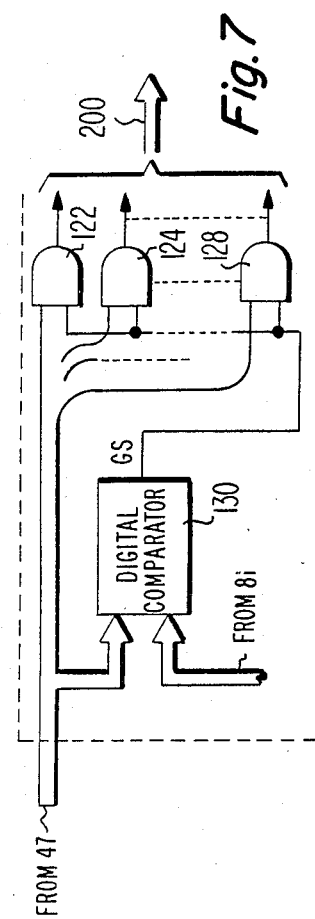
*Fig.6*
*Fig.7*

LUMINANCE PEAKING FILTER FOR USE IN DIGITAL VIDEO SIGNAL PROCESSING SYSTEMS

This application is a Continuation-in-Part of application Ser. No. 572,364, filed Jan. 19, 1984 (now abandoned).

The present invention relates to apparatus for processing the luminance component of a video signal and more particularly for establishing a desired amplitude versus frequency response of the luminance component in, e.g., a digital television receiver. In order to improve the sharpness and fine detail resolution of the image, it is desirable to improve the transient response of the luminance channel by increasing the high frequency response of the luminance channel.

The response of video signal processing systems may be subjectively improved by increasing the steepness of amplitude transitions in the video signals, and the response may also be improved by the generation of a preshoot just before a transition and an overshoot just after the transition. It is also known that a desired amplitude or phase characteristic (or both) as a function of frequency may be formed substantially without introducing phase non-linearity or phase distortion by means of an apparatus wherein delayed signals generated at terminals (usually referred to as taps) along a delay line or like device are combined in a predetermined manner. Such apparatus, sometimes called a "transversal equalizer" or "transversal filter", is generally described in U.S. Pat. No. 2,263,376 (A. D. Blumlein et al.).

In a television or similar system for processing a composite signal to provide a predetermined signal transfer characteristic, such as accentuation of selected frequencies, it is desirable to include peaking circuitry in the luminance channel which is readily adaptable to control (e.g., relatively accentuate or peak) high frequency portions of the luminance signal component of the video signal. For example, it may be desirable to controllably accentuate the amplitude of certain relatively high frequency portions of the luminance signals depending on the quality of the received television signal.

FIG. 1 illustrates a transfer function which when applied to the luminance signal produces very desirable subjectively improved reproduced images. The present invention is directed toward apparatus for generally emulating this transfer function in the luminance channel of a digital video signal processing system. In the context of a digital TV receiver such apparatus must be realized with a minimum of parts in order to produce a cost effective receiver.

SUMMARY OF THE INVENTION

Apparatus in accordance with the present invention comprises a luminance peaking circuit realized by a finite impulse response (FIR) filter including a low pass FIR filter in cascade connection with the parallel connection of first and second FIR filters. The first FIR filter produces a low pass filter response. The second FIR filter produces a bandpass response. The output of the second FIR filter is applied to a variable scaling device, the output port of which is connected to one input port of an adder circuit. The output port of the first FIR filter is coupled to a second input port of the adder circuit, the output port of which is the output port of the peaking circuit. The high frequency response of the peaking circuit is adjusted by varying the scale factor applied to the variable scaling device. All of the filter weighting elements are realized by bit shifting the respective samples to minimize the required filter hardware.

BRIEF DESCRIPTION OF THE DRAWING

FIGS. 3 and 6 are logic schematic diagrams of FIR filter circuits for generally emulating the transfer response curve of FIG. 1;

FIG. 7 is a schematic diagram of a simplified coring circuit.

DETAILED DESCRIPTION

Figure 1:
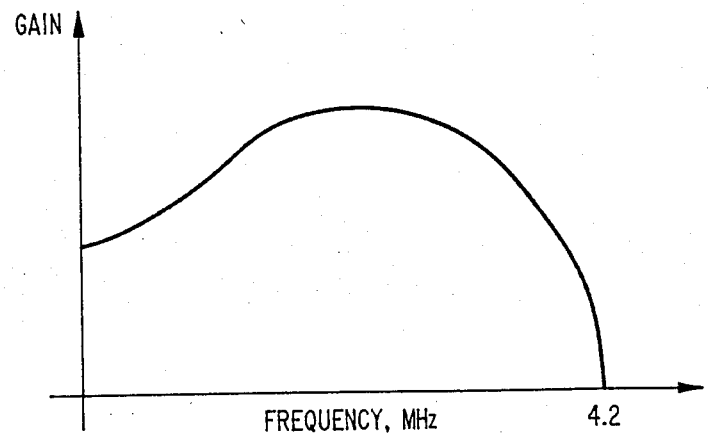
FIG. 1 is a peaked amplitude versus frequency response curve for the luminance component of a video signal in a TV receiver which subjectively enhances reproduced images.

The luminance peaking circuit in a TV receiver is employed to subjectively enhance transitions of vertical lines in the displayed image. Signal representing relatively sharp transitions generally contain high frequency signal components. The transitions may be selectively enhanced by increasing the amplitude response of the high frequency components of the luminance signal. However, care must be taken to ensure that the peaking of the higher frequencies of the luminance signal does not introduce ringing of these high frequency components. Thus, the overall peaking response must be tailored to roll off gradually at the upper end of the spectrum while guaranteeing a high degree of attenuation of frequencies in the range of the sound signal components. In addition, it is most desirable that the peaking response have linear phase characteristics. It has been found in the past that the general frequency response curve illustrated in FIG. 1 produces the desired peaking characteristics when generated with linear phase components.

Figure 2:
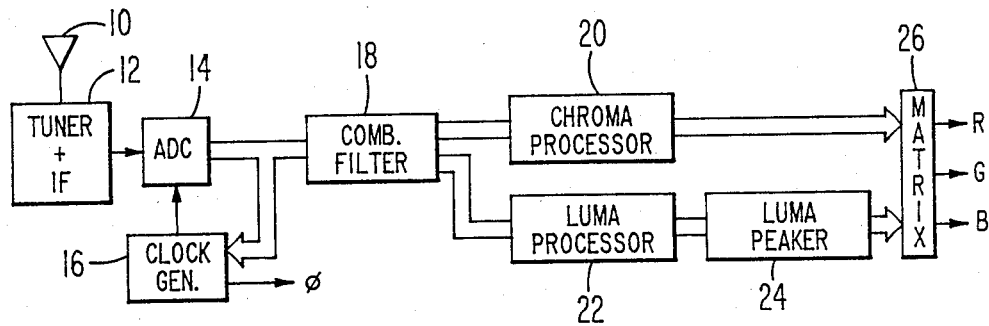
FIG. 2 is a block diagram of a digital TV receiver including a digital peaking circuit.

FIG. 2 is a block diagram of a digital TV receiver indicating the major signal processing circuits including a luminance peaking circuit. In the figure, broadcast TV signals are received by antenna 10 and applied to conventional tuner and intermediate frequency (IF) circuitry 12. Baseband analog composite video signal from element 12 is applied to the input or an analog-to-digital converter (ADC) 14 which samples the signal at a rate of, e.g., four times the color subcarrier frequency and generates digital representations of the analog signal. The ADC 14 is controlled by a sampling signal provided by a clock generator 16 which may be a phase locked loop circuit responsive to the digitized color burst reference component of the composite signal. Output samples from ADC 14 are applied to a comb filter 18 which selectively extracts the luminance and chrominance components of the composite video signal. The chrominance component is applied to the chrominance processing circuit 20, which may include gain control function, filter circuits and color mixture signal demodulating circuitry, wherein the chrominance signal is suitably conditioned for application to the color matrix circuit 26.

The luminance component from comb filter 18 is applied to the luminance processing circuit 22 which may include brightness control and vertical detail enhancement functions, etc. Conditioned luminance signal from processor 22 is applied to the luminance peaking circuit 24 which selectively enhances the amplitude response of the higher frequency components of the luminance signal. Peaked luminance signal from element 24 is applied to the color matrix 26 wherein it is appropriately combined with the processed chrominance signal to generate R, G and B color signals for driving the display tube. Note, in the figure, broad connecting lines are intended to indicate multiple signal paths for accommodating parallel bit streams, e.g., pulse code modulated binary samples.

It is appreciated by those skilled in the art of designing digital processing circuitry, that it requires significant numbers of devices to perform even relatively simple processing functions. For example, to sum two 8-bit signals requires in excess of 200 transistors. It is readily apparent that in order to realize the requisite processing functions of a TV system in digital hardware, with a manageable and cost effective number of devices, each functional component must be designed in the simplest configuration commensurate with the desired response characteristics. Mindful of this constraint, the following peaking circuits were developed which, in the preferred embodiment, requires only one multiplier circuit.

Figure 3:
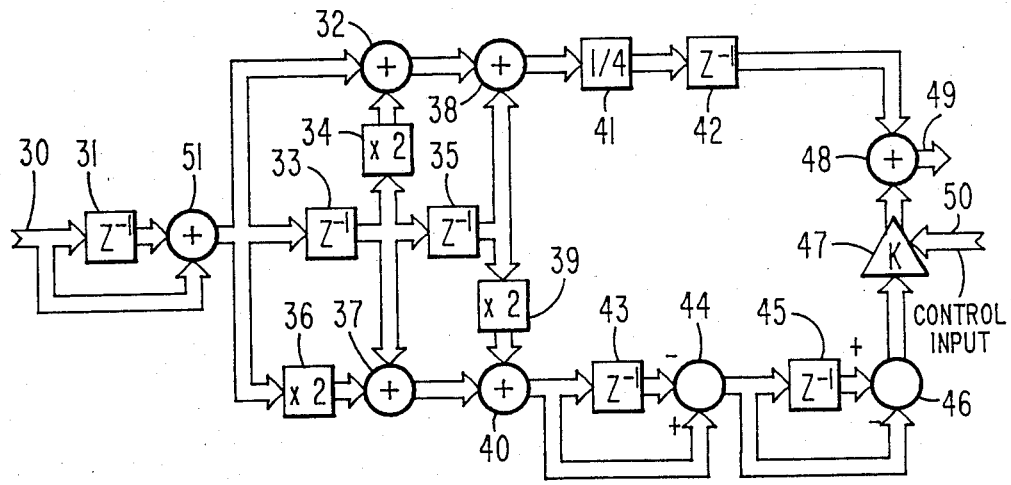

FIG. 3 is a peaking circuit comprised of delay stages, adders, and one multiplier element 47. Multiplier element 47 is of the type which scales applied signals by a constant factor. Multiplier 47 is desirably of the type wherein its scale factor K is electrically variable by control signals applied to its control input terminal 50 so that the peaking function may be adapted to the condition of the applied luminance signal. Ideally, the scale factor K should be linearly variable to provide a wide range of adaptability.

In FIG. 3 luminance samples are applied to input port 30 and peaked samples are available at the output port 49 of adder 48. The luminance samples are coupled to the input port of delay element 31 which is serially coupled to adder circuit 51. The luminance samples are also applied to a second input port of adder 51. The transfer function exhibited at the output of adder 51 relative to the input samples applied to port 30 is a cosine response. In "z" transform notation the transfer function is described by the equation $$S51/SIN = 1 + z^{-1} \qquad (1)$$

where S51 and SIN are the values of the signal samples at the output port of adder 51 and input port 30 respectively.

Output samples from adder 51 are applied to a first further filter including circuit elements 32, 33, 34, 35, 38, 41 and 42 and to a second further filter including circuit elements 33, 35, 36, 37, 39, 40, 43, 44, 45, 46 and 47. Circuit elements 33, 35, 42, 43 and 45 are delay elements which delay signal samples by one sample period and are for example latches clocked synchronously at the sample rate. Circuit elements 34, 36 and 39 are times-two multipliers. Assuming that the samples are n-bit pulse code modulated (PCM) binary codes, the times-two multipliers may be wiring arrangements which alter or shift the significance of the bit positions, of the respective samples, leftward one bit position (where the leftmost bit of the PCM code is the most significant bit). Circuit elements 32, 37, 38 and 40 are binary adders and elements 44 and 46 are binary subtractors designed to comport with the signal format, e.g. two's complement numbers. Circuit element 41 is a scaling circuit which divides samples by a factor of four. For binary PCM samples, element 41 may be a wiring arrangement which alters the significance of the sample bits two bit positions rightward.

The first further filter, in the frequency range of interest, provides a generally low pass response with a fixed gain coefficient. The second further filter, in the frequency range of interest, provides a generally high frequency or band pass response with a variable gain coefficient, i.e., the second filter attenuates lower frequency components of luminance signal more than the relatively higher frequency components. Output signal from the first and second further filters are linearly summed to produce the peaked luminance signal wherein the first further filter contributes the lower frequency luminance components and the second filter contributes the higher frequency components. Since the second filter has a variable gain coefficient the amplitude of the higher frequency components of the luminance signal can be scaled relative to the low frequency component to produce the most desirable composite response.

In FIG. 3 the first further filter is the upper signal path and the second further filter the lower signal path of the illustrated circuitry. Considering first the upper signal path, samples from adder 51 are applied to one input port of adder circuit 32 and to the input port of delay element 33. Output samples from delay element 33 are applied to the input port of delay element 35 and to times-two circuit 34. Weighted samples from times-two circuit 34 are applied to a second input port of adder 32, the output of which is coupled to a first input port of adder 38. Output samples from delay element 35 are applied to a second input port of adder 38. Output samples from adder 38 are divided by four in element 41. Samples from element 41 are applied to delay element 42 which delays the combined and weighted samples by one sample period. In "z" transform notation the transfer function provided by the elements between adder 51 and the output port of delay element 42 is described by the equation $$S42/S51 = \tfrac{1}{4}(1 + 2z^{-1} + z^{-2})z^{-1} \qquad (2)$$

which corresponds to the transfer function of the first further low pass filters and is in general a low pass response. The complete transfer function between input port 30 and the output port of delay element 42 is described by $$S42/SIN = \tfrac{1}{4}(z^{-1} + 3z^{-2} + 3z^{-3} + z^{-4}). \qquad (3)$$

Samples from the output port of adder 51 are applied to times-two multiplier 36, the output port of which is coupled to a first input port of adder 37. Samples from delay element 33 are coupled to a second input port of adder 37, the output of which is coupled to a first input port of adder 40. Samples from delay element 35 are multiplied by two in element 39 and thereafter applied to a second input port of adder 40. The transfer function provided by the elements between adder 51 and the output port of adder 40 is given by $$S40/S51 = 2 + z^{-1} + 2z^{-2} \quad (4)$$

which is in general a low pass response.

Samples from adder 40 are applied to delay element 43 and as minuends to subtraction circuit 44. Output samples from delay element 43 are applied as subtrahends to subtraction circuit 44. The transfer function provided by the elements between adder 40 and the output port of subtraction circuit 44 is given by $$S44/S40 = 1 - z^{-1}. \quad (5)$$

Samples from subtraction circuit 44 are applied to the input port of delay element 45 and as subtrahends to subtraction element 46. Delayed output samples from delay element 45 are applied as minuends to subtraction circuit 46. The transfer function provided by the circuit elements between the output of subtraction circuit 44 and the output port of subtraction circuit 46 is given by $$S46/S44 = z^{-1} - 1. \quad (6)$$

Output samples from subtraction circuit 46 are applied to the input port of variable gain multiplier 47 which multiplies the samples by the variable factor K. The composite transfer function between the input port 30 and the output port of multiplier 47 is given by $$S47/SIN = -2K + Kz^{-1} + Kz^{-2} + Kz^{-3} + Kz^{-4} - 2 \cdot Kz^{-5} \quad (7)$$

which in general is a bandpass response.

Samples from delay element 42 and variable gain multiplier 47 are combined in adder 48 which provides output samples from the peaking circuit at output port 49. The transfer function T(z) of the peaking circuit is given by the equation $$T(z) = -2K + (K + \tfrac{1}{2})z^{-1} + (K + \tfrac{3}{2})z^{-2} + (K + \tfrac{3}{2})z^{-3} + (K + \tfrac{1}{2})z^{-4} - 2Kz^{-5}.$$

Figure 5:
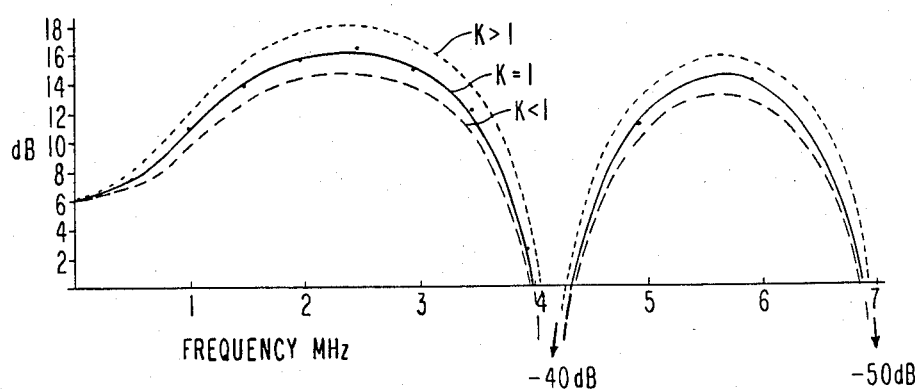
FIG. 5 is the relative amplitude versus frequency transfer function exhibited by the arrangement of FIG. 3 for the factor K of the variable scaling circuit equal to 1.

The transfer function of the peaking circuit is generally illustrated in FIG. 5. Note the response is generally flat near DC then rises and peaks between 2.2−2.5 MHz and then rolls off crossing through zero near 4.05 MHz. The response curve has a minimum value of about −40 dB at approximately 4.2 MHz. The response curve then rises again and peaks near 5.7 MHz. This latter peak is undesirable. However, it is assumed that prefiltering before analog-to-digital conversions will substantially eliminate all signal components in this part of the frequency spectrum.

In FIG. 5 the solid curve represents the response curve for a K factor or 1. The dotted and broken line curves represent the response curves for K factors greater and less than one respectively. For a K factor of zero the high frequency luminance comopnents will be significantly attenuated relative to the DC response. By appropriate selection of the factor K the luminance signal may be either peaked or depeaked. (Note - the response curve illustrated in FIG. 5 assumes a sample rate occurring at four times the frequency of the color subcarrier of an NTSC composite color video signal.)

Figure 4:
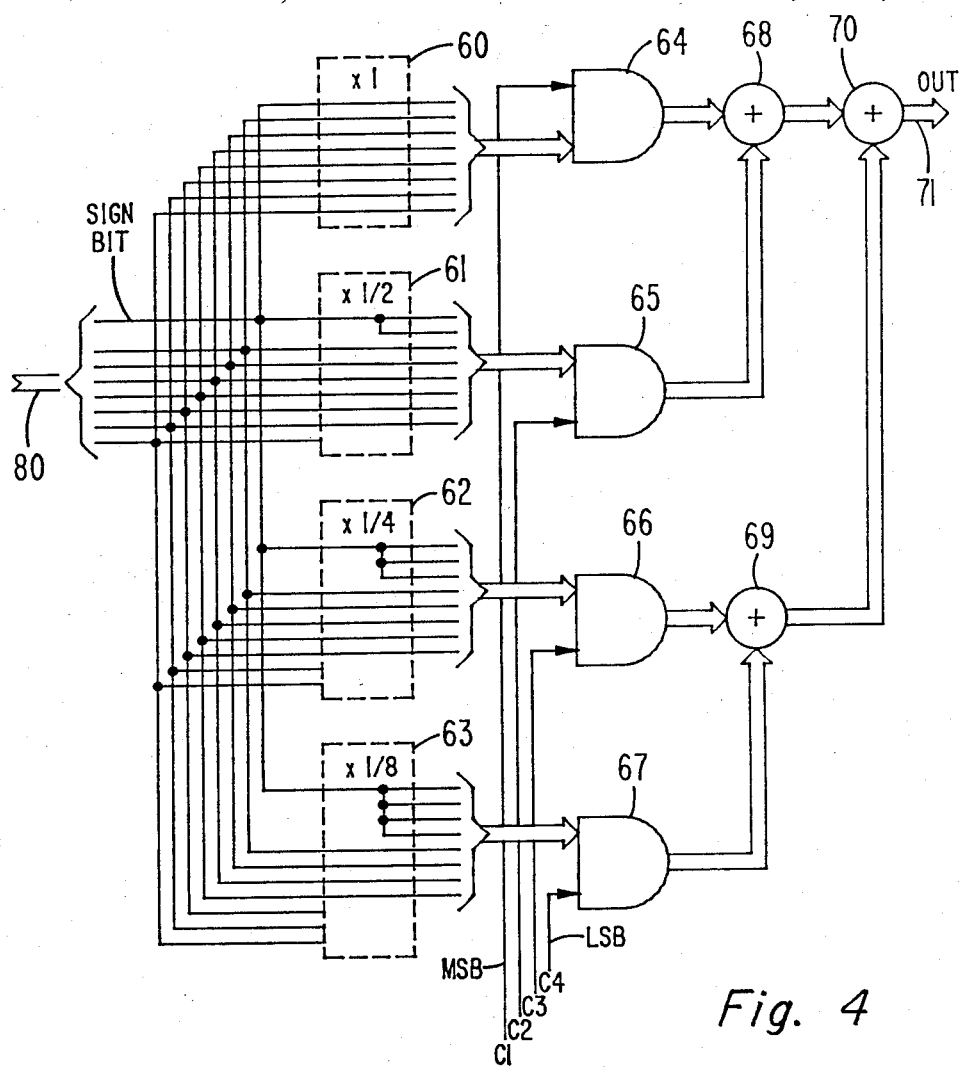
FIG. 4 is a block diagram of a variable scaling circuit which may be employed in the FIG. 3 circuit.

FIG. 4 is a logic schematic diagram of a variable multiplier circuit which may be implemented for the element 47 in FIG. 3. This circuit is a programmable shift-and-add type weighting circuit capable of weighting samples by factors which are the sums of powers of two and/or reciprocal powers of two. The illustrated circuit includes only four bit-shifters and three adders to produce a sixteen step linear response for a four bit control signal. The illustrated circuit multiplies by a factor K equal to one-eighth the value of the decimal number corresponding to the four bit binary control signal $C_1C_2C_3C_4$. For example, if $C_1C_2C_3C_4$ are 0101 respectively which equals decimal 5, then the K factor is 5/8.

Signals to be multiplied are applied to input port 80. The samples are applied to bit shifters 60–63 which shift the bits of the applied PCM samples by 0, 1, 2 and 3 significant bit positions rightward respectively corresponding to a scaling by 1, $\tfrac{1}{2}$, $\tfrac{1}{4}$ and $\tfrac{1}{8}$. The sign bit line is connected for two's complement numbers which requires that the more significant bit positions that are vacated in the bit shifted PCM signals replicate the sign bit. The bit-shifted or scaled samples are applied to gating circuits 64–67 controlled by control lines $C_1$, $C_2$, $C_3$ and $C_4$ respectively. Responsive to a logic zero on the control line the corresponding gating circuit outputs a zero valued sample. Responsive to a logic one on the control line, the corresponding gating circuit passes the applied scaled sample. The scaled output samples or zero values from the gating circuits 64–67 are summed in the adder tree including adder circuits 68, 69 and 70 to produce the input samples weighted by the scale factor K, at the output port 71.

Returning to the example of $C_1C_2C_3C_4$ equal to 0101 and an input sample of decimal value 16, the decimal values applied by bit-shifters 60–63 to gating circuits 64–67 are 16, 8, 4 and 2 respectively. Gating circuits 64 and 66 responsive to logic zero "0" control signals produce zero valued output values and gating circuits 65 and 67 responsive to logic one control signals produce output values 8 and 2 respectively which sum to the decimal value 10. The binary value of the control signals 0101 equals decimal 5 and the K factor is thus $\tfrac{5}{8}$. Five-eights of sixteen equals 10 which is the output value produced by the adder tree at output terminal 71.

The circuit of FIG. 4 can be expanded to produce a larger number of multiplication factors by including additional bit-shifters in parallel with bit shifters 60–63 and corresponding, gating circuits and adders, or by making the bit shifters programmable rather than hard-wired.

Depending on the technology employed to realize the circuitry, it may be necessary to use pipelining techniques to accommodate differences in circuit delays, for example, where two adder circuits are connected in cascade as in FIGS. 3 and 4. Those skilled in the art will recognize such conditions and design their circuitry accordingly.

FIG. 6 is a peaking circuit switchable between two transfer functions. One of the transfer functions is similar to the transfer function of the FIG. 3 apparatus. The second transfer function is generally a wideband response with a null at 7.2 MHz (for NTSC sample rates). Additionally, the FIG. 6 circuitry includes adaptive coring circuitry. Elements in FIG. 6 designated with like numerals as elements in FIG. 3 perform like functions.

Elements 82 and 81 make up the adaptive coring circuitry which for large signals may be assumed to provide a unity transfer function, i.e. they do not affect the signal. Assuming this to be the case, the transfer function between input port 30 and output port 49 is identical to that of the FIG. 3 circuit when the contacts of switch 83 are connected to terminals AA'. The circuitry to the left of switch 83 is slightly more parts efficient than the corresponding circuitry of FIG. 3, but it can be shown that it performs the same function.

Next consider both contacts of switch 83 connected to terminal B. In this state it can readily be shown that the transfer function, $F_B$, between input port 30 and output port 49 is described by the equation $$F_B = -Kz^{-1} + (K+1)z^{-2} + (K+1)z^{-3} - Kz^{-4} \quad (9)$$

which in general is a cosine like frequency response having a null at approximately 7.2 MHz. The circuit is operated in this mode when it is desired to reproduce the maximum possible horizontal detail as for displaying text material, for example. The switch 83 may be a manually operated switch or an electronic switch means, e.g. responsive to the current signal spectral content. Note that the function $F_B$ is also a peaked function.

Recall that the peaking function is accomplished by enhancing the higher frequency components of the signal spectrum and adding the enhanced components back with the lower frequency components. In video signals, however, the higher frequency components are typically significantly attenuated relative to lower frequency components. This attenuation is a consequence of video signals being broadcast with insufficient bandwidth. The result is that the higher frequency components have a poorer signal-to-noise ratio and are particularly susceptible to quantization noise from the analog-to-digital conversion process. When the received signal is weak, the signal-to-noise ratio of the higher frequency components tends to degrade significantly and the peaking circuit ends up adding enhanced noise back into the signal. This undesirable result may be prevented by coring the enhanced signal prior to adding it back to the other frequency components.

Coring is a signal processing operation in which low-level signal variations are removed from a signal to improve the overall signal-to-noise ratio. Fixed threshold coring, in which low-level signal variations not exceeding a fixed threshold level are removed, is generally inadequate in a TV receiver because the viewer is more perceptive of noise occurring in a dark scene (i.e. light spots in a dark background) than a light scene (i.e. dark spots in a light background). It is therefore desirable to provide a relatively higher coring threshold for low luminance signal levels or darker scenes and a relatively lower coring threshold for lighter scenes.

Referring again to FIG. 6, element 82 is a coring circuit, an example of which is shown in FIG. 7. Element 81 is a memory element programmed to output particular threshold values to coring circuit 82. Luminance signal from multiplier 47 is applied to the signal input port of coring element 83 wherein it is compared with the threshold value from memory element 81. If the signal value is larger than the threshold value, the signal is passed to adder 48. If the signal value is less than the threshold value, a predetermined value, e.g. zero is output by corer 82 to adder 48.

The signal addressing the threshold value memory 81 is low frequency lumninance which, in general, represents the average image brightness. Low frequency luminance is obtained via delay element 78 and adder 79 coupled to the output port of adder circuit 77. The filter transfer function, $S_{79}/S_{30}$, provided by the elements coupled between signal input port 30 and the output port of adder 79 is given by the equation $$S_{79}/S_{30} = (1 + z^{-1})(1 + z^{-2})^2. \quad (10)$$

This filter function has a 3 dB point at approximately 1.2 MHz, and is acquired with minimal additional hardware keeping within the design goals.

The signal samples from adder 79 are divided by a factor of 64, e.g. right shifted six significant bit positions before applying them to the address input port of memory element 81. The signal is divided for two reasons. First, it is unnecessary that the threshold values have high resolution, i.e. thirty-two different threshold values are sufficient for seven bit plus sign bit luminance signals. Secondly, if the input samples at port 30 are eight bits wide, after coursing through adder circuits 51, 77 and 79 they are increased to a width of 11 bits. The lower order bits are insignificant with respect to the nominal coring thresholds and thus contain no useful control information. The division may be performed ahead of delay element 78 and adder 79 to further reduce the hardware requirements. As a further alternative, the division may be split with a portion ahead of delay element 78 and a portion after adder 79. For example, a four bit right shift may be done ahead of elements 78 and 79 followed by a two bit right shift after element 79. This reduces the size of adder 79 from a 10 bit device to a six bit device, an appreciable hardware saving. This last example provides a good compromise between hardware savings and round off errors which result from division by bit shifts (and truncation).

FIG. 7 shows one coring circuit which may be implemented as element 82 in FIG. 6. This circuit consists of a comparator 130 to which input signals from multiplier 47 and threshold values from memory 81 are applied. If the magnitudes of samples from multiplier 47 exceed the threshold value, comparator 130 outputs a logically high gating signal, GS, otherwise comparator 130 develops a logical low level at output GS. Gating signal GS is applied to respective first input terminals of the parallel array of AND gates 122-128. Respective bits of the signal samples from multiplier 47 are applied to respective second input terminals of AND gates 122-128. When the gating signal GS is high the AND gates 122-128 pass the input signals to the output port 200 of the coring circuit unaltered. Alternatively, when the gating signal GS is low, AND gates 122-128 provide logical low values to output port 200. Note that comparator 130 may be a window comparator arranged to provide a logical high output signal whenever the input signal is greater than the applied threshold value or lesser than the negative of the threshold value, and to produce a logical low output level otherwise.

What is claimed is:

1. A processing circuit for processing digital video luminance signals comprising:
    a source of said digital video luminance signals;
    a first FIR filter having an input port coupled to said source and having an output port, said first FIR filter exhibiting a cosine transfer function;
    a second FIR filter having an input port coupled to the output port of said first FIR filter and having an output port, said second FIR filter exhibiting a generally low pass frequency response;
    a third FIR filter having an input port coupled to the output port of said first FIR filter and having an output port, and including a variable scaling circuit responsive to gain control signals for controlling the amplitude of signals output by said third FIR filter, said third FIR filter exhibiting a frequency response which attenuates the relative high frequency spectrum of luminance signal less than the relatively low frequency spectrum of luminance signal; and combining means coupled to the output ports of said second and third FIR filters for combining filtered signal samples provided thereby, said combined filtered samples corresponding to processed digital video luminance signal.

2. A digital peaking circuit for processing a luminance component for a digital video signal comprising:

a source of digital luminance signals;

a first digital processing circuit having an input port coupled to said source, having an output port and exhibiting the transfer function $f1 = 1 + z^{-1}$ where Z connotes the conventional z transform;

a second digital processing circuit having an input port coupled to the output port of said first processing circuit, having an output port and exhibiting the tranfer function $f2 = R\ (z^{-1} + 2z^{-2} + z^{-3})$, where R is a fixed weighting factor;

a third digital processing circuit having an input port coupled to the output port of the first processing circuit, having an output port and exhibiting the transfer function $f3 = K(-2 + 3z^{-1} - 2z^{-2} + 3z^{-3} - 2z^{-4})$ where K is a variable weighting factor; and combining means coupled to the output ports of said second and third digital processing circuits for combining signal samples produced by the respective circuits to produce processed luminance signal.

3. The peaking circuit set forth in claim 2 wherein said first digital processing circuit comprises a delay element having an input port coupled to said source and having an output port and an adder circuit having first and second input ports coupled respectively to the input and output ports of said delay element, said adder circuit having an output port corresponding to the output port of said first digital processing circuit.

4. The peaking circuit set forth in claim 2 wherein the second digital processing circuit comprises:

first and second cascade connected delay elements having respective output ports, the first delay element having an input port coupled to the output port of the first digital processing circuit;

first weighting means coupled to the output port of the first delay element for weighting signal samples from said first delay element;

means coupled to the input port of the first delay element, the output port of the second delay element and said first weighting means for combining signal samples available therefrom;

second weighting means coupled to the means for combining signal samples for weighting the combined signal samples; and a third delay element having an input port coupled to second weighting means and having an output port which corresponds to the output port of said second digital processing circuit.

5. The peaking circuit set forth in claim 4 wherein the first and second weighting means are data bus arrangements to alter the significance of sample bits.

6. The peaking circuit set forth in claim 4 wherein the first and second weighting means weight samples applied thereto by the factor 2 and ¼ respectively.

7. The peaking circuit set forth in claim 2 wherein third digital processing circuit comprises:

first and second cascade connected delay elements having respective output ports, said first delay element having an input port coupled to the output port of said first digital processing circuit;

first and second weighting circuits respectively coupled to the input port of the first delay element and the output port of the second delay element for weighting signal samples respectively applied thereto;

means coupled to the first and second weighting circuits and the output port of the first delay element for combining signal samples from said weighting circuits and said first delay element;

first and second subtraction circuits;

a third delay element having an output port and having an input port coupled to said means for combining signal samples;

respective means for coupling the input and output ports of said third delay element to minuend and subtrahend input ports respectively of said first subtraction circuit;

a fourth delay element having an input port coupled to said first subtraction circuit and having an output port;

respective means for coupling the input and output ports of said fourth delay element to subtrahend and minuend input ports respectively of said second subtraction circuit; and a multiplier circuit having an input port coupled to the second subtraction circuit and having an output port corresponding to the output port of said third digital processing circuit.

8. The peaking circuit set forth in claim 7 wherein the first and second weighting means are data bus arrangements to alter the significance of sample bits.

9. The peaking circuit set forth in claim 7 wherein the multiplier circuit comprises:

a plurality of gated weighting circuits having respective data input ports coupled to the input port of said multiplier and having respective control input terminals, each of said gated weighting circuits providing at respective output ports, weighted replicas of signal samples applied to said input ports for a first logic state applied to its respective control terminal or zero valued samples for a second logic state applied to its respective control terminal, and each of said gated weighting circuits being arranged to weight input samples by successively decreasing values; and means for combining output samples from all of said gated weighting circuits to produced scaled replicas of samples applied to said multiplier circuit.

10. The peaking circuit set forth in claim 9 wherein each of said plurality of gated weighting circuits comprises:

an n+1-input AND gate, n of said inputs being signal sample inputs and the n+1st input being coupled to its respective control terminal; and bit-shift means for altering the significance of sample bit positions, said bit-shift means being coupled between the n signal sample inputs of the AND gate and the multiplier input port.

11. A processing circuit for processing digital video luminance signals comprising:

a source of digital video luminance signals;

first processing circuitry having an input port coupled to said source and having an output port, said first processing circuitry having a transfer function f1 between its input and output ports described by the equation $f1 = R(z^{-1} + 3z^{-2} + 3z^{-3} + z^{-4})$ where R is a fixed weighting factor;

second processing circuitry having an input port coupled to said source and having an output port, said second processing circuitry having a transfer function f2 between its input and output ports described by the equation $f2 = K(-2 + z^{-1} + z^{-2} + z^{-3} + z^{-4} - 2z^{-5})$ where K is a variable weighting factor; and means coupled to the output ports of the first and second processing circuitry for combining signal samples produced thereby, said combined signals corresponding to processed luminance output signal.

12. The processing circuitry set forth in claim 11 wherein said second processing circuitry includes a multiplier circuit to perform scaling by the factor K and wherein said multiplier includes a control input port for applying control signals to vary the factor K.

13. The processing circuit set forth in claim 12 wherein the multiplier circuit comprises:

a plurality of gated weighting circuits having respective data input ports coupled to the input port of said multiplier circuit, and having respective control input terminals, each of said gated weighting circuits providing at respective output ports, weighted replicas of signal samples applied to said input ports for a first logic state applied to its respective control terminal or zero valued samples for a second logic state applied to its respective control terminal, and each of said gated weighting circuits being arranged to weight input samples by successively decreasing values; and means for combining output samples from all of said gated weighting circuits to produced scaled replicas of samples applied to the input port of said multiplier circuit.

14. The processing circuit set forth in claim 1 wherein said combining means is coupled to said third FIR filter by apparatus comprising:

a coring circuit having a threshold value input port, said coring circuit having a signal path connected between said third FIR filter and said combining means;

memory means having a data output port coupled to said threshold value input port, and having an address input port, said memory means being programmed to provide threshold values corresponding to applied address signals; and a fourth FIR filter having an input port coupled to the output port of said first FIR filter and an output port coupled to said address input port, said fourth FIR filter exhibiting a low pass frequency response.

15. The processing circuit set forth in claim 14 wherein the transfer functions of the first, second, third and fourth FIR filters correspond to $F_1$, $F_2$, $F_3$ and $F_4$ respectively, and which are given by the equations $F_1 = 1 + z^{-1}$,
$F_2 = R(z^{-1} + 2z^{-2} + z^{-3})$,
$F_3 = K(-2 + 3z^{-1} - 2z^{-2} + 3z^{-3} - 2z^{-4})$, and
$F_4 = W(1 + z^{-2})^2$, where R, K and W are scale factors and z connotes the conventional z transform variable.

16. The processing circuitry set forth in claim 11 wherein the means for combining signal samples is coupled to the second processing circuitry by apparatus comprising:

third processing circuitry having an input coupled to said source and having an output port, said third processing circuitry having a transfer function f3 between its input and output ports described by the equation $f3 = W(1 + z^{-1})(1 + z^{-2})^2$ where W is a constant;

digital control means, having an input port coupled to the output port of said third processing circuitry, for developing digital threshold signals; and fourth processing circuitry having an input port coupled to said second processing circuitry and an output port coupled to said means for combining signal samples, said fourth processing circuitry including comparing means for comparing signal samples from said second processing circuitry and said threshold signals, said fourth processing circuitry producing said signal samples as output samples in response to a first result of comparison and producing a predetermined digital signal as output signal in response to a second result of comparison.

17. A variable bandwidth digital luminance signal processing circuit comprising:

an input port for applying said luminance signal;

switch means having first, second and third input ports and first and second output ports for selectively connecting its first and second output ports to its first and second input ports respectively or alternatively connecting its first and second output ports simultaneously to its third input port;

means coupled between said input port and said switch means first input port and exhibiting the transfer function $W(1 + 3z^{-1} + 3z^{-2} + z^{-3})$ where W is a scale factor;

means coupled between said input port and the second input port of said switch means and exhibiting the transfer function $2 + 3z^{-1} + 3z^{-2} + 2z^{-3}$;

means coupled between said input port and the third input port of said switch means exhibiting the transfer function $z^{-1}(1 + z^{-1})$;

signal combining means having first and second input ports and having an output port at which processed luminance signal is available;

means exhibiting the transfer function $z^{-1}$ for coupling the first output port of said switch means to the first input port of said signal combining means;

means, including circuitry exhibiting the transfer function $K(-1 + 2z^{-1} - z^{-2})$ where K is a scaling factor, for coupling the second output port of said switch means to the second input port of said combining means.

18. The processing circuit set forth in claim 17 wherein the means for coupling the switch means to the second input port of said signal combining means further includes an adaptive coring circuit responsive to coring control circuitry coupled to said input port and exhibiting a frequency response, $F_c$, defined by the equation $F_c = (1 + Z^{-1})(1 + Z^{-2})^2$ where Z is the conventional Z transform variable.

19. The processing circuit set forth in claim 1 wherein the digital video luminance signals are digital samples occurring at a sample rate S, and wherein:

said first FIR filter exhibits a cosine transfer function having a maximum response at zero Hertz and a first null at a frequency of S/2 Hertz;

said second FIR filter exhibits a cosine transfer function having a maximum response at zero Hertz and a first null at a frequency of S/2 Hertz and wherein the rolloff of the second FIR filter is more gradual than said first FIR filter; and said third FIR filter exhibits a cosine transfer function having a first null at zero Hertz and a second null between 4.1 and 4.3 MHz.

20. The processing circuit set forth in claim 1 wherein said digital video luminance signal occur at a predetermined sample rate and wherein said first FIR filter includes:

a one-sample delay element having an input port coupled to said source, for providing delayed samples at an output port; and a first combining means for additively combining samples, having a first and second input ports coupled to said source and said one-sample delay element respectively and having an output port corresponding to the output port of said first FIR filter; and wherein said second FIR filter includes:

second and third one-sample delay elements coupled in cascade to the input port of said second FIR filter for providing samples delayed by one and two sample periods respectively relative to samples applied to the input port of said second FIR filter; and second combining means coupled to the input port of said second FIR filter and respective output ports of said second and third one-sample delay elements for additively combining samples from said second one-sample delay element in a ratio of two-to-one with samples from said third one-sample delay element and from said second FIR filter input port and producing combined samples at an output port thereof; and wherein said third FIR filter includes:

third combining means coupled to the output port of said first FIR filter and said second and third one-sample delay elements for additively combining samples from said second one-sample delay element in a ratio of one-to-two with samples from said first FIR filter output port and said third one-sample delay element and producing combined samples at an output port thereof;

a fourth one-sample delay element coupled to the output port of said third combining means;

first subtractive combining means for subtractively combining samples from said fourth one-sample delay element and the output port of said third combining means;

a fifth one-sample delay element coupled to said first subtractive combining means; and a second subtractive combining means for subtractively combining samples from said fifth one-sample delay element and said first subtractive combining means to produce said filtered signal samples.

21. A variable bandwidth digital luminance signal processing circuit for processing luminance samples occurring at a rate S, comprising:

an input port for applying said luminance signal;

switch means having first, second and third input ports and first and second output ports for selectively connecting its first and second output ports to its first and second input ports respectively or alternatively connecting its first and second output ports simultaneously to its third input port;

means coupled between said input port and the first input port of said switch means and exhibiting a cosine frequency response defined by a third order polynominal of Z transform variables and having a maximum at zero Hertz and a first null at a frequency of S/2;

means coupled between said input port and the second input port of said switch means and exhibiting a cosine frequency response defined by a third order polynominal of Z transform variables and having a maximum at zero Hertz and a first null between 4.1 and 4.3 MHertz;

means coupled between said input port and the third input port of said switch means and exhibiting a cosine frequency response defined by a first order polynominal of Z transform variables and having a maximum at zero Hertz and a first null at S/2 Hertz;

signal combining means having first and second input ports and having an output port at which processed luminance signal is available;

a delay element coupled between the first output port of said switch means and the first input port of said signal combining means; and means, including circuitry exhibiting a cosine frequency response defined by a second order polynominal of Z transform variables and having a first null at zero Hertz and second null at S Hertz, for coupling the second output port of said switch means to the second input port of said signal combining means.

22. The processing circuit set forth in claim 21 wherein the means coupled between said input port and the first input port of the switch means comprises:

a first delay element having an input coupled to said input port and having an output;

an adder having an output and having first and second inputs coupled respectively to said input port and the output port of said first delay element; and second and third delay elements coupled in cascade to the output of said adder and having respective outputs;

combining means having respective inputs coupled to the outputs of said adder and the second and third delay elements for combining samples from said second delay element in a ratio of two-to-one with samples from said adder and said third delay element.

23. The processing circuit set forth in claim 22 wherein the means coupled between said input port and the second input port of said switch means includes:

further combining means having respective inputs coupled to the output of said adder and said second and third delay elements for additively combining samples from said second delay element in a ratio of one-to-two with samples from said adder and said third delay element.

24. The processing circuit set forth in claim 23 wherein the means coupled between said input port and the third input port of said switch means includes:

means for coupling the output of said second delay element to the third input port of said switch means.

* * * * *